United States Patent [19]

Jacquelin

[11] 4,081,585
[45] Mar. 28, 1978

[54] FORCED FLOW ELECTROCHEMICAL BATTERY

[75] Inventor: Jean Jacquelin, Limours, France

[73] Assignee: Compagnie Generale d'Electricite S.A., Paris Cedex, France

[21] Appl. No.: 779,876

[22] Filed: Mar. 21, 1977

[30] Foreign Application Priority Data

Mar. 22, 1976 France .................................. 76.08216

[51] Int. Cl.² ............................................. H01M 8/24
[52] U.S. Cl. ......................................... 429/23; 429/15
[58] Field of Search .................... 429/21, 22, 23, 15

[56] References Cited

U.S. PATENT DOCUMENTS 3,902,918 9/1975 Pompon .................................. 429/15

Primary Examiner—John H. Mack
Assistant Examiner—H. A. Feeley
Attorney, Agent, or Firm—Sughrue, Rothwell, Mion, Zinn and Macpeak

[57] ABSTRACT

Cells are fed in series with an alkaline solution containing zinc in suspension and electrically connected in series. The cells are grouped in modules fed in parallel with the solution and electrically connected in series, each module being fed with the solution through an inlet pipe and an outlet pipe. Electrolytic resistors are connected in the hydraulic circuit of each pipe to maintain a potential difference in the solution between the modules and a tank for storing the solution.

21 Claims, 12 Drawing Figures

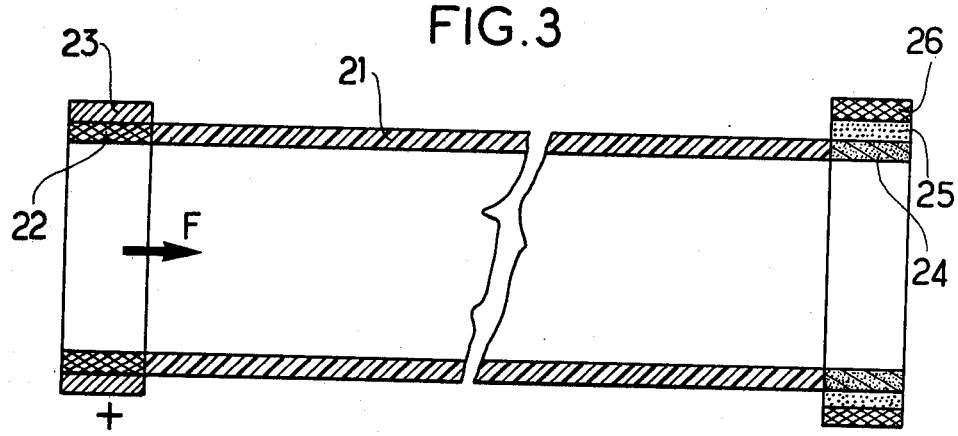
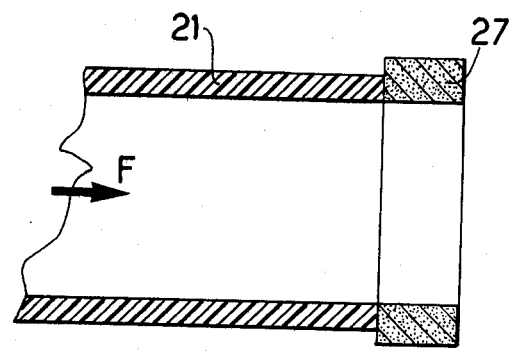
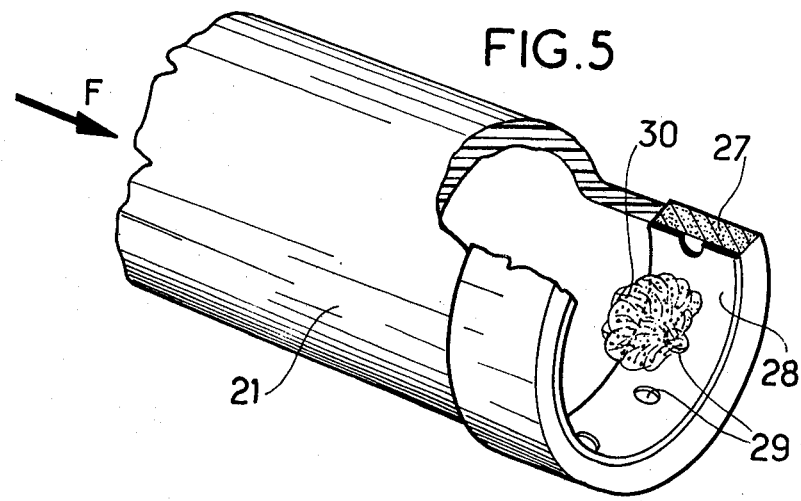

FORCED FLOW ELECTROCHEMICAL BATTERY

FIELD OF THE INVENTION

The present invention relates to a forcedflow electrochemical battery.

BACKGROUND OF THE INVENTION

Forced-flow electrochemical batteries are already well known in the art and are, at present, the object of much research with a view to providing non-polluting vehicles.

Among these batteries, air-zinc systems offer considerable advantages for such applications.

It is briefly stated for reference that an elementary cell of such a battery comprises an active catalytic part in which there flows an alkaline solution containing zinc powder in suspension; on coming into contact with the active part, air oxidizes. The zinc and hence an electromotive force is generated.

To constitute a battery, it is therefore necessary to couple such elementary cells together both electrically and hydraulically.

These cells are fed with the alkaline solution in series and these same cells, are connected electrically in series.

In this way, a set of cells or module comprises a limited number of cells and it is, of course, possible to couple such modules together with a view to forming a battery having predetermined rated electrical characteristics.

Such modules can of course be hydraulically fed in series with said alkaline solution but particular precautions must be taken when electrically coupling them, as set forth by the Applicant in his U.S. Pat. No. 3,997,903 dated Aug. 31, 1976, for an "Electric safety coupling for a forced flow electro-chemical battery."

However, the Applicant has found that it is also possible to feed the modules hydraulically in parallel if particular precautions are also taken, in this case with a view to avoiding certain operational risks already mentioned in said U.S. Pat. No. 3,997,903 and also other hazards which will be set forth in the descriptive part of the present specification.

SUMMARY OF THE INVENTION

The present invention provides an electrochemical battery comprising a plurality of cells each comprising radially from the inside towards the outside in particular; a negative collector grid, a porous separator, a porous active catalytic layer and a positive collector grid. These elements are fed in series with an electrolytic solution comprising an active material in suspension and in particular zinc powder. This solution is conveyed by forced flow inside said cells, the cells being grouped into $m$ modules each capable of delivering a potential difference U and connected electrically in series within said modules. These modules themselves are electrically connected in series and fed with said solution in parallel, this solution being conveyed by means of a pump from a storage tank towards each of the modules through an input pipe then returned to said tank after having passed through said modules through an output pipe. The battery is characterized in that with $p$ designating the rank of a module, said input pipe as well as said output pipe each comprises at least one electrolytic resistor, such electrolytic resistors being called respectively the input resistor and the output resistor in which said solution flows. These resistances are connected in such a way that said input resistor is capable of making the potential of the solution vary from the value of the potential in said tank up to the value of the potential at the input of said module, whereas said output resistor is capable of making the value of the potential of the solution vary from the value of the potential at the output of said module up to the value of the potential in said tank.

Embodiments of the invention are described purely by way of example having no limiting character, with reference to the accompanying drawings.

BRIEF DESCRIPTION OF THE DRAWINGS

FIG. 3 shows a first embodiment of an electrolytic resistor according to the invention;

FIG. 4 shows a second embodiment of an electrolytic resistor according to the invention;

FIG. 5 shows a third embodiment of an electrolytic resistor according to the invention;

DESCRIPTION OF THE PREFERRED EMBODIMENTS

Figure 1:
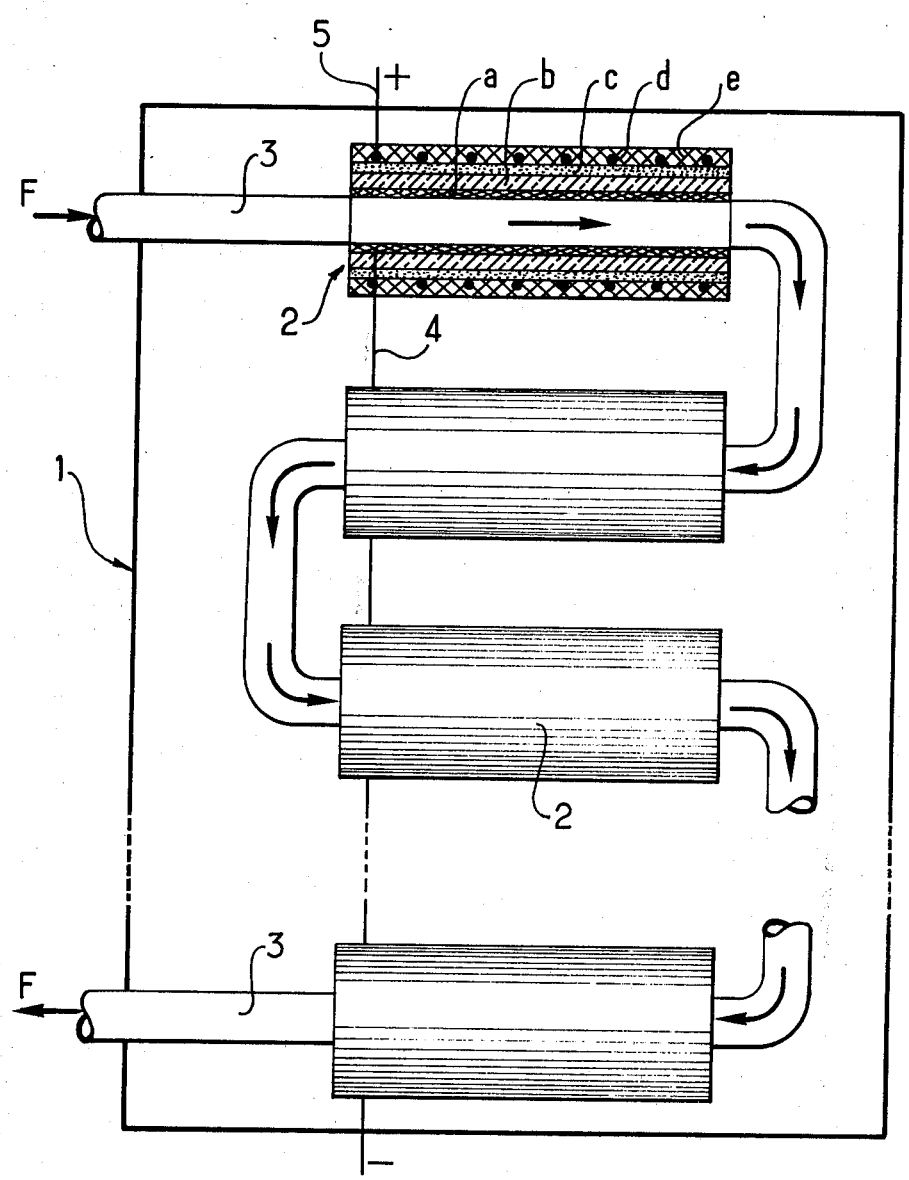
FIG. 1 shows the structure of a module using the method according to the invention.

FIG. 1 shows a module 1 constituted by a certain number $n$ of cells 2 substantially identical to one another, each providing an electro-motive force $u$ and fed in series by a potassium hydroxyde solution containing zinc powder in suspension, such a feed being effected though ducts 3 and being materially shown by arrows F.

Such cells are, for example of the type described by the Applicant in its U.S. Pat. No. 3,849,202 corresponding to French Application No. 71 45 734 of Dec. 20, 1971, as well as in its applications for additions French No. 72 229 61 of June 26, 1972 and French No. 73 147 65 of the Apr. 24, 1973, for a "Forced flow electrochemical battery."

It is mentioned for reference, that each of the said cells 2 comprises a negative collector grid $a$, a porous separator $b$, a porous active catalytic layer $c$, and a positive collector grid $d$, surrounded by a porous water-repellent layer $e$. Throughout the whole length of the cells there passes a potassium hydroxyde and zinc powder solution as shown and the oxidation of the zinc, by the outside air generates an electro-motive force between the grids $a$ and $d$. It must be understood that the cells shown are electrically connected together in series by means of conductors 4, the electromotive force generated by such a module being collected at the terminals of the external connections 5.

It will be observed, however, that the number of cells 2 in a module is limited by pressure drop engendered in the said cells by the flow of solution.

Indeed, if the pressure of the solution at the input is designated as $po$ and if the pressure drop in a cell is designated as $\Delta p$, it will be seen that in the last cell (in this instance, the cell at the bottom of FIG. 1), rhe pressure is $po - n\Delta p$, $n$ being the number of cells of the module. Now, it is necessary for that pressure to remain between certain limits in order that the porous catalytic layer $c$ operates correctly and oxidises the zinc. It will therefore be understood that the value of $n$ is limited by this restriction.

Advantageously the liquid flow enters through the upper cell and leaves through the lower cell, as is shown in the figure. Indeed, if the total height of the module is designated as $h$ and the density of the solution is designated as $p$, the difference in the static pressure between the top and the bottom is equal to $ph$. The pressure drop being, as previously indicated, $n\Delta p$, the resulting difference in pressure is $n\Delta p - ph$. Thus, the pressure drop $n\Delta p$ is partly compensated by the difference in static pressure $p\ h$, this being an advantage since the number $n$ of cells per module can thus be somewhat greater than if the reverse direction of flow had been chosen.

Figure 2:
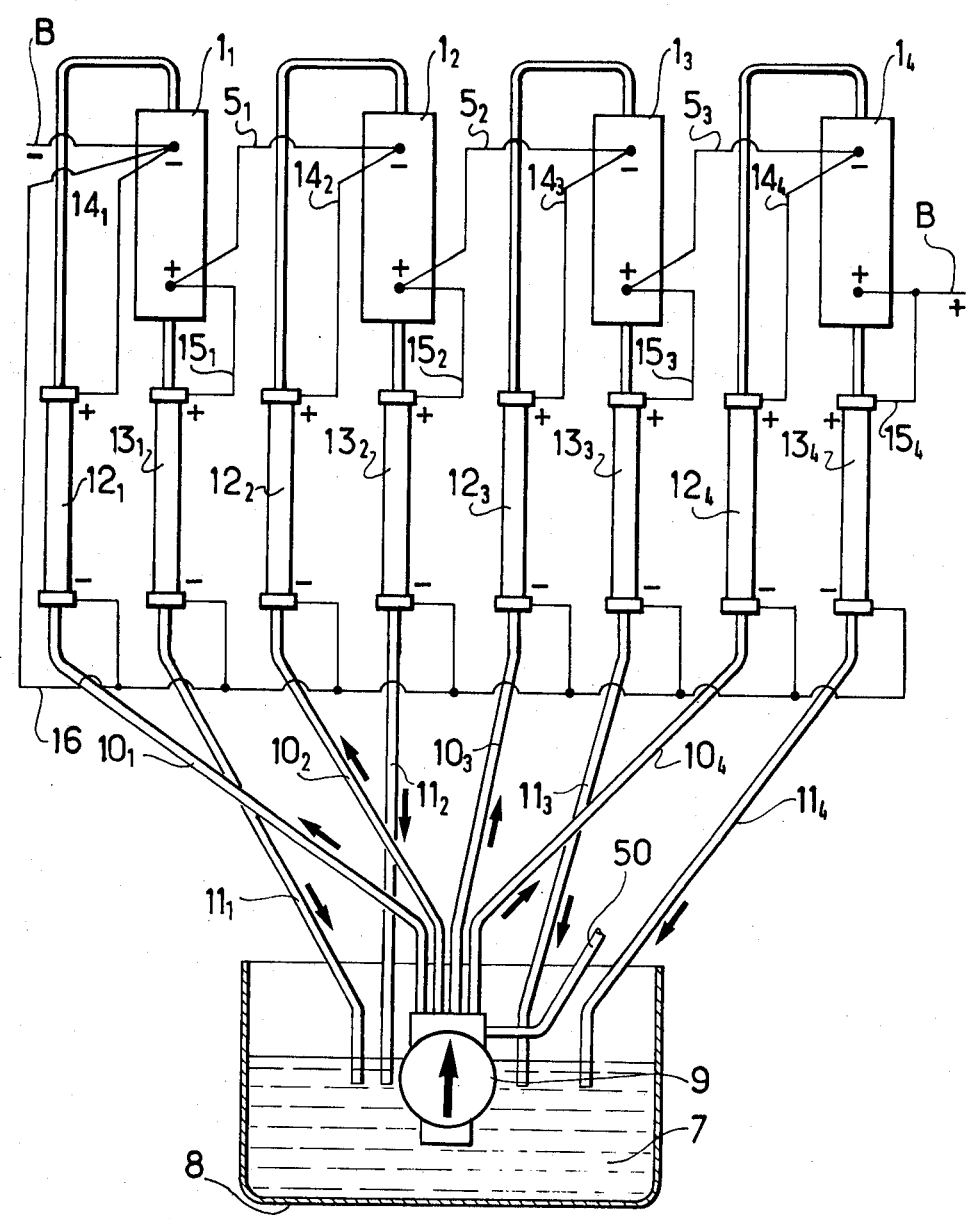
FIG. 2 is an example of an embodiment of a battery according to the invention.

FIG. 2 illustrates a first battery embodying the invention.

It comprises $m$ modules $1_1$ to $1_4$ such as described with reference to FIG. 1, (in this case $n = 4$ by way of a non limiting example). Generally, the letter $p$ could designate the rank of any module.

These modules are electrically interconnected in series through their external connection terminals $5_1$ to $5_3$. Each module delivers a potential difference (p.d.) U, equal to $nu$, $u$ being the electromotive force per module cell and $n$ being the number of cells per module, the battery therefore delivering a p.d. of 4U between the end therminals B.

From the hydraulic point of view, such modules are fed with a potassium hydroxyde solution 7 comprising zinc powder in suspension and enclosed in a tank 8 by means of an input pump 9 immersed in the tank 8.

Such feeding is therefore effected as showh in FIG. 2 and for each of the modules through an input pipe $10p$ and an output pipe $11p$ leading to the tank 8, namely, respectively $10_1$ to $10_4$ and $11_1$ to $11_4$ for the modules $1_1$ to $1_4$.

Electrolytic "input" resistors $12_1$ to $12_4$ are connected in the circuit of said input pipes $10_1$ to $10_4$ and likewise electrolytic "output" resistors $13_1$ to $13_4$ are connected in the circuit of said output pipes $11_1$ to $11_4$.

Advantageously, these resistors are of the type described in our U.S. patent application Ser. No. 743 256 of Nov. 19, 1976 for "An electrolytic resistor."

As shown in FIG. 2 all the negative ends of the electrolytic resistors are connected by an electrical conductor 16 to the negative terminal B of the battery. The positive end of each electrolytic resistor is connected to the terminal of the module in the vicinity of which ends the electrolyte pipe in the circuit of which said electrolytic resistor is connected.

For more precision, the various embodiments of such electrolytic resistors according to said U.S. patent application will be reviewed.

According to FIG. 3, an electrolytic resistor comprises a tube 21 made of an insulative material. The positive end of the resistor is formed by a grid 22 surrounded by a sleeve 23. The grid 22 is made of a metal which is resistant to the electrolyte.

The negative end of the resistor comprises successively from the inside towards the outside, a porous insulating and hydrophilous separator 24 made of asbestos ceramics or plastics material, an "air" electrode and lastly a grid 26.

The electrolyte which is an alkaline aqueous solution containing particles of zinc in suspension as well as hydroxide or zincate in solution flows in the direction shown by the arrow F, but can of course flow in the opposite direction.

The following electrochemical phenomena occur in such a resistor:

The $OH^-$ ions of the electrolyte which migrate towards the positive end oxidize the zinc particles retained by the grid 22 to produce a zincate. This prevents any evolution of oxygen at the positive end and any resulting corrosion.

At the negative end, the "air" electrode 25 consumes oxygen in the air, thus forming $OH^-$ ions. It should be observed that if the $OH^-$ ions were not formed in this way, they would be formed by electrolysis of the zincate in the electrolyte and zinc deposits would occur at this end, thus obstructing the tube 21 and provoking dangerous evolution of hydrogen. It should also be observed that the tube 21 is made of a water-repellent material such as polytetrafluoroethylene, or "Teflon." Thus when the tube is completely empty, the continuous film of electrolyte which covers the walls and tends to cause a deterioration of the insulator because of the electric current and of a heating effect breaks due to the water-repellent effect of the tube wall, this completely interrupting the electric current.

Of course, the tube 21 can be made of an electrically insulative material coated internally with a layer of Teflon.

Likewise, only a part of said tube delimited by two transversal cross-sections perpendicular to the axis need be made of Teflon. In the embodiments which are described hereinbelow, both the positive end and the tube 21 are made as has just been described.

In FIG. 4, the negative end is formed by a ring 27 advantageously made of a material having a high hydrogen overpressure, e.g. a material based on magnesium. In this way, zinc particles or dendrites of zinc are deposited on its surface by electrolysis of the zincate in the solution and are then swept away by the flow of electrolyte.

Of course such a material must not form intermetallic compounds with zinc.

For this reason, it is desirable to avoid in this material inclusions of elements such as: copper, nickel, iron, or zinc.

It is also desirable for the inside surface of the ring 27 to be polished. Advantageously, this surface is also partitioned or compartmented into metallic zones and insulative zones.

Such partitioning can be effected on a microscopic scale for example by covering the metal surface with a layer of insulating oxide which is broken or craked by thermal treatment. In this way, zinc dendrites are deposited on the breaks; their base is very small and is very fragile, this making it easy for the electrolyte flow F to tear them away.

The partitioning can also be effected on the macroscopic scale. For this purpose, grooves which are filled with an insulative material such as an epaxy resin are formed on the inside surface of the ring 27. Then the ring is polished, thereby forming a plurality of small metallic divisions separated by the insulator. In this case the dentrites are deposited on the metallic divisions and such a deposit is also easier to separate from the ring 27.

In the embodiment illustrated in FIG. 5, the ring 27 is covered on its inside surface with an insulating layer 28 pierced by small holes 29.

In this way, the zinc dendrites grow in the holes 29 and spread as shown at 30, i.e. they have a thin base in the holes 29 ending in a bushy extermal top portion such as shown. Such a spread results in a high shearing force at their base and easy separation from the ring 27 by the flow of solution.

Figure 6A:
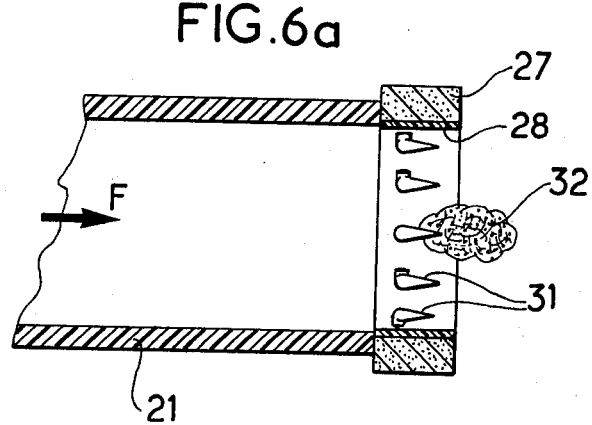
FIGS. 6a and 6b show a fourth embodiment of an electrolytic resistor according to the invention.
Figure 6B:
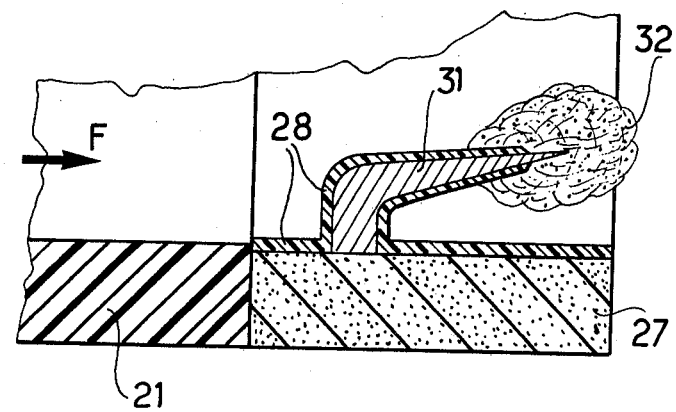

In the embodiment shown in FIGS. 6a and 6b, the ring 27 is still covered with an insulative layer 28.

It will be seen that projections 31 of the same material as the ring 7 have been disposed on its inner surface. These projections end in a point and are covered except at the point with the insulating layer 28. As can be seen, the points of the projections 31 point in parallel directions and along the direction of flow of the solution F.

It will be seen in the figures that the zinc dendrites spread out at the end of such growths as shown at 32.

Figure 7A:
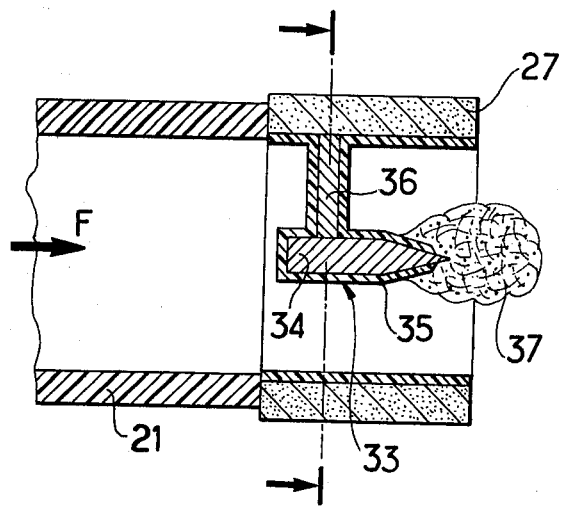
FIGS. 7a and 7b show a fifth embodiment of an electrolytic resistor according to the invention.
Figure 7B:
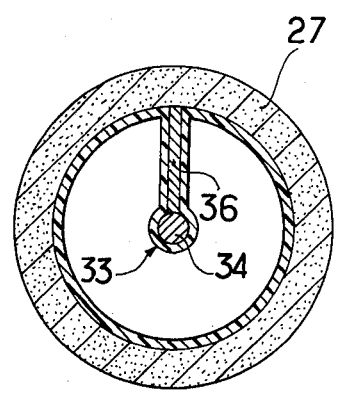

In the embodiments shown in FIGS. 7a and 7b, a part 33 disposed in the axis of the tube 21 is connected to the ring 27. This part has a metallic core 34 which is for example cylindrical, ending in a conical point and covered except at the end of the point with an insulative layer 35. This metal core 34 is made integral with an electric conductor 36 which is also insulatied and is itself connected to the ring 27. As previously, the conical point lies parallel to the direction of flow F of electrolyte.

Whatever the embodiment chosen such an electrolytic resistor is capable of making the potential of a solution vary even within wide limits without there being any danger of blocking, explosion and the like such as mentioned hereinabove. Consequently, it is very advantageously used in the battery of the invention.

The operation of the battery such as illustrated in FIG. 2 will now be explained.

The origin of the potentials, i.e. zero, will be conventionally ascribed to the electrolyte 7 of the tank 8. Due to the electrical connection 16, the terminal B of the battery is therefore substantially at this original potential.

It is therefore apparent from FIG. 2 that each of the input resistors makes it possible to raise the potential of the solution which passes through it from a value of zero which is that of the tank 8 to a value which is substantially equal to that of the input potential of the module which it feeds.

To give a clear idea, where U is the *p.d.* delivered by a module, it will be seen that:

The resistor $12_1$ therefore raises the potential of the solution form 0 to a low value and could possibly be omitted.

The resistor $12_2$ therefore raises the potential of the solution from 0 to U.

The resistor $12_3$ therefore raises the potential of the solution form 0 to 2U.

The ressitor $12_4$ therefore raises the potential of the solution from 0 to 3U.

Conversely, each of the output resistors makes it possible to lower the potential of the solution which passes through it from a value substantially equal to that of the output potential of the module to a value of zero.

Consequently:

The resistor $13_1$ therefore lowers the potential of the solution from U to 0.

The resistor $13_2$ therefore lowers the potential of the solution from 2U to 0.

The resistor $13_3$ therefore lowers the potential of the solution from 3U to 0.

The resistor $13_4$ therefore lowers the potential of the solution from 4U to 0.

The result of this is that in each module the electrolyte solution is returned to the tank 8 at a potential whose value is equal to that of the potential which it had when it was flowing from the tank towards said module. This potential is conventionally zero or substantially zero.

This prevents leakage currents in the solution from causing appreciable corrosion, gaseous evolution and zinc deposits.

It will be observed also that it is advantageous for all the resistors to have substantially identical dimensions (length and cross-section) so that the pressure drops are equal when the electrolytic solution passes through them, the consequence of this being to promote the even operation of the modules.

Figure 8:
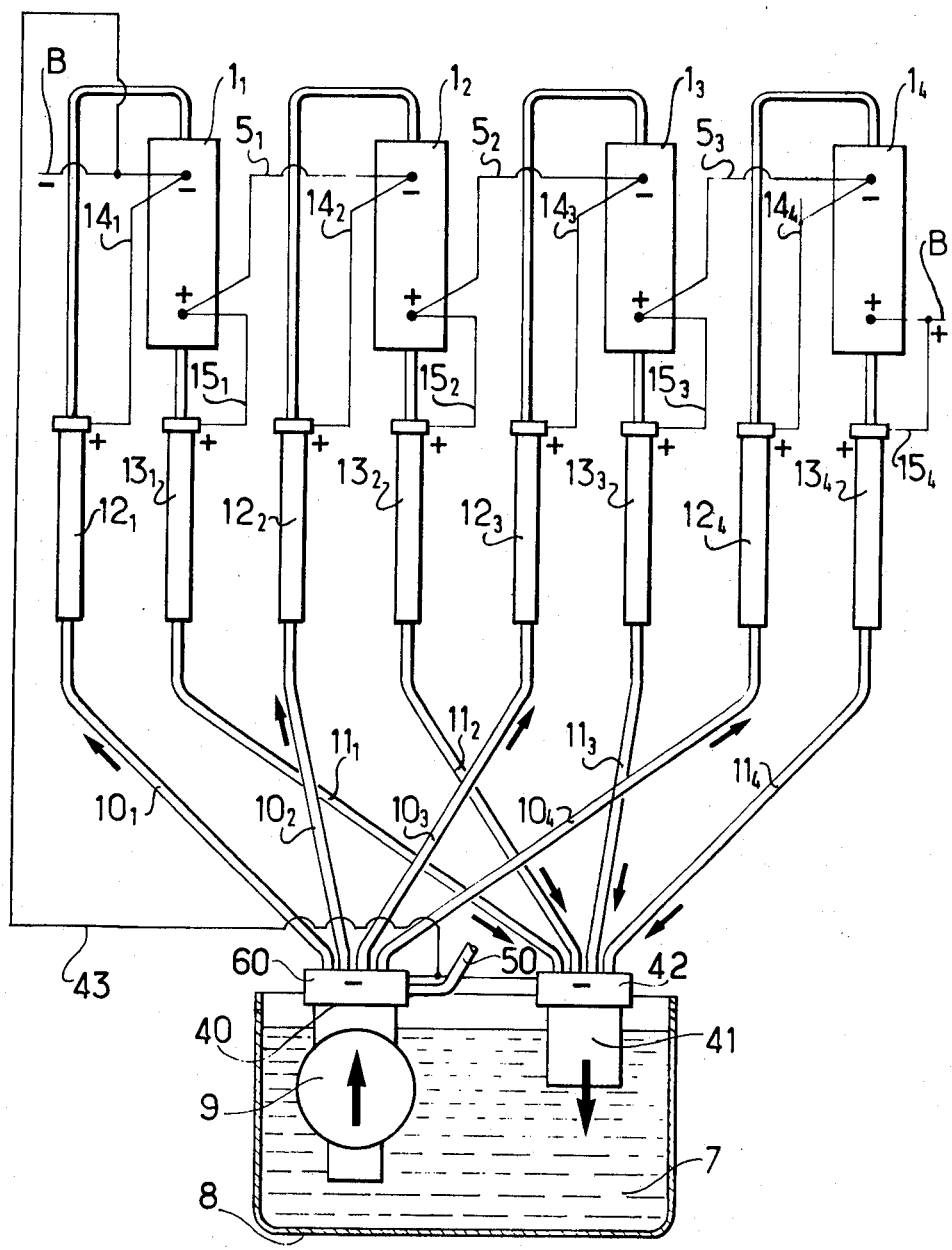
FIG. 8 is another example of the embodiment of a battery according to the invention.

FIG. 8 is another showing of a battery according to the invention.

It comprises the same elements such as modules, resistors, pipes such as described in FIG. 2, connected and fed substantially in a similar way and which will not be described again here. However, in this embodiment, the input pipes $10_1$ to $10_4$ lead to a collector tube 40 communicating with the pump 9 and whose upper part 60 is in the form of a ring. The output pipes $11_1$ to $11_4$ also lead to a collector tube 41 whose upper end 42 is also in the form of a ring. Said rings 60 and 42 are formed as described with reference to FIGS. 3 to 7b and hence in the same way as the negative end of the electrolytic resistors $12_1$ to $12_4$ and $13_1$ to $13_4$; of course in the present case described in FIG. 8, the negative end of these resistors does not comprise any elements such as described in FIGS. 3 to 7b. In other words, the negative ends of electrolytic resistances are commoned with the internal surface of the rings 60 and 42.

Further, in this embodiment, the collector tubes 40 and 41 are both connected to the negative output terminal B— of the battery by a cable 43. Operation is strictly identical to that described with reference to FIG. 2. The only difference is that all the negative ends of the electrolytic resistors are gathered together at 60 and 42, this facilitating construction and reducing the cost price.

Figure 9:
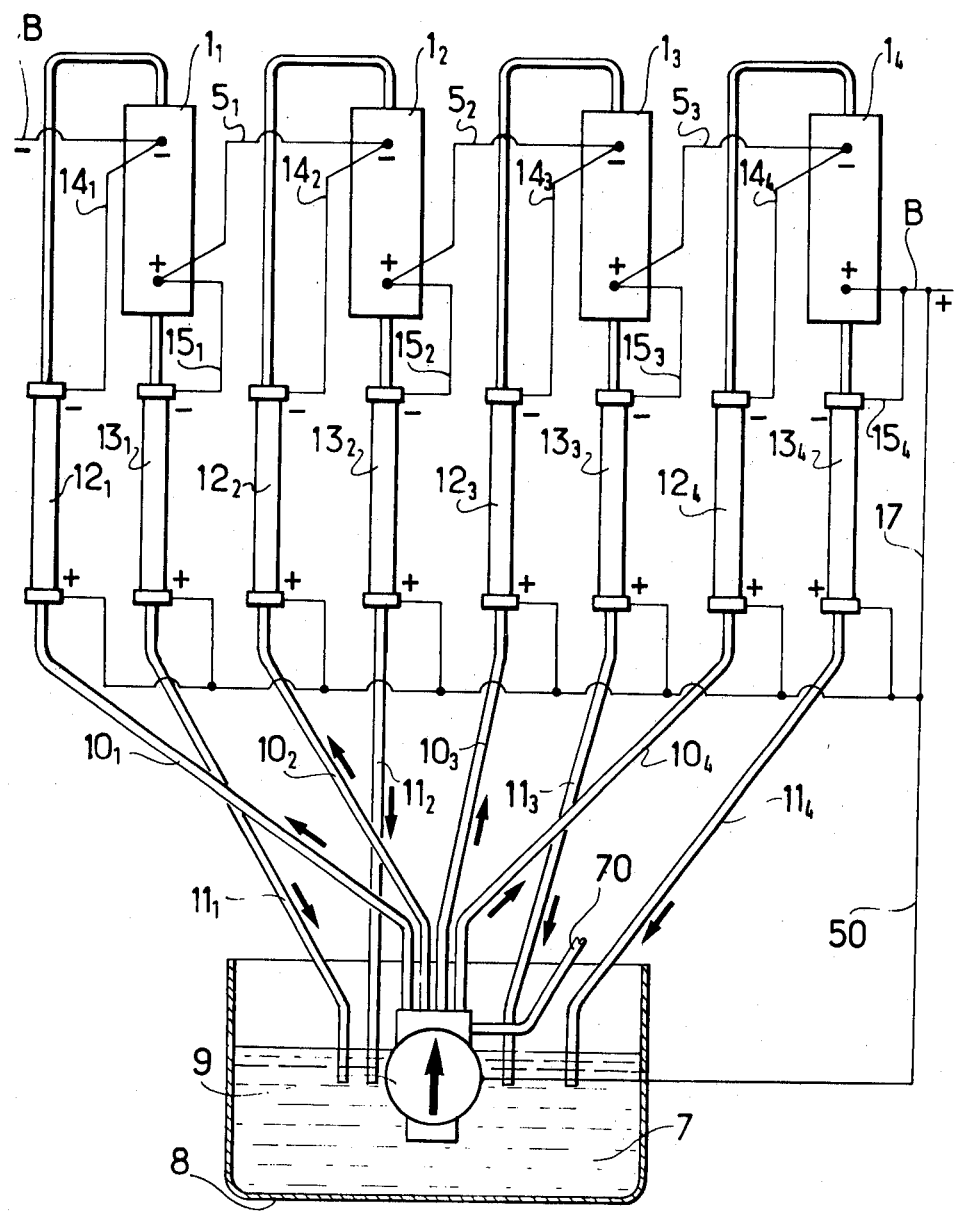
FIG. 9 is another example of an embodiment of battery according to the invention.

FIG. 9 is also an embodiment of the battery of the invention.

It comprises the same elements such as modules, resistors, pipes, collector tubes such as described in FIG. 2 connected and fed substantially in an analogous way and which will therefore not be described again here.

In this embodiment, the positive output terminal B+ of the battery is connected to the positive ends of all the electrolytic resistors by means of the conductor 17. The electrolyte of the tank 8 is still conventionally taken as the origin potential in the following description.

It is therefore apparent that in this embodiment each of the input resistors makes it possible to lower the value of the potential of the solution which passes through it, from a valve of zero which is that of the tank 8 to a value substantially equal to that of the input potential of the module which it feeds.

The resistor $12_1$ therefore lowers the potential of the solution from 0 to —4U.

The resistor $12_2$ therefore lowers the potential of the solution from 0 to —3U.

The resistor $13_3$ therefore lowers the potential of the solution from 0 to —2U.

The resistor $12_4$ therefore lowers the potential of the solution from 0 to $-U$.

Conversely each of the output resistors makes it possible to raise the value of the potential of the solution which passes through it from a value substantially equal to that of the output potential of the module to a value of zero. Consequently:

The resistor $13_1$ therefore raises the potential of the solution from $-3U$ to 0.

The resistor $13_2$ therefore lowers the potential of the solution from $-2U$ to 0.

The resistor $13_3$ therefore lowers the potential of the solution from $-U$ to 0.

The resistor $13_4$ raises the potential of the solution only by a negligible value and could be omitted.

Whatever the embodiment chose, the battery of the invention makes it possible to reduce the number of pumps in relation to the number of these elements in batteries with series hydraulic feed, due to the hydraulic feeding in parallel of the modules.

Its cost price is therefore moderate.

Also such a cost price can be reduced further by using electrolytic resistors whose structure has been reviewed in the present invention and which precisely makes it possible to produce an advantageous embodiment of the battery of the invention.

Figure 10:
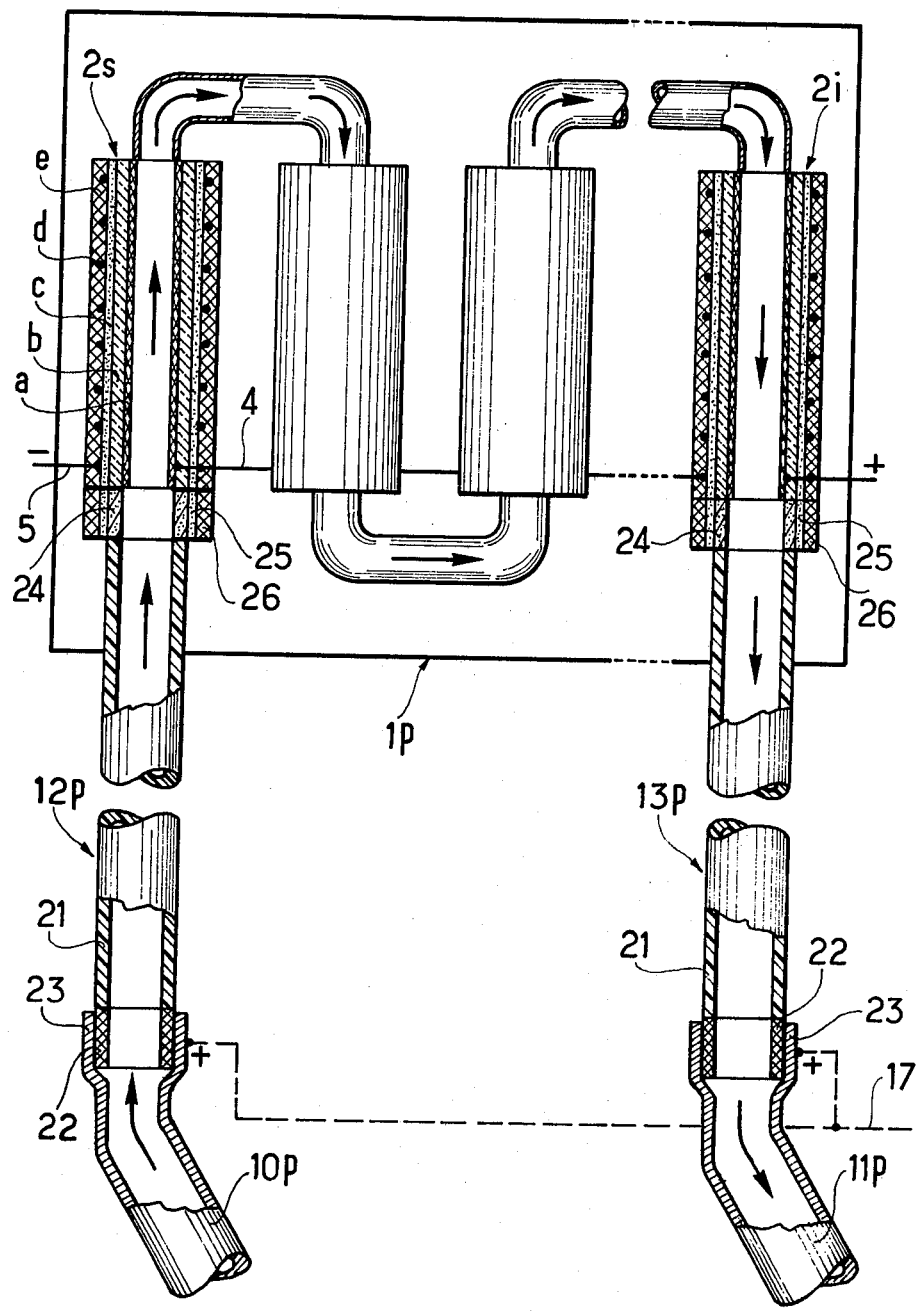
FIG. 10 is an advantageous variant of the preceding embodiment.

FIG. 10 therefore illustrates such an advantageous embodiment applicable as described with reference to FIG. 9.

FIG. 10 is a module $1p$ whose rank is $p$, such as one of those shown in FIG. 9 on a larger scale and in particular the top and bottom cells $2s$ and $2i$ of said module whose cells have already been described in FIG. 1.

Such an embodiment therefore consists in using electrolytic input resistors $12_p$ and output resistors $13_p$ of the type described with reference to FIG. 3. It is therefore stated for reference that each of them comprises a tube 21 made of an insulative material. The positive end of the resistor is formed by a grid 22 made of a metal which is capable of resisting the electrolyte, surrounded by a sleeve 23.

The negative end of the resistor therefore comprises, from the inside towards the outside, successively a porous, insulative and hydrophilous separator 24 made of asbestos, ceramics or plastics material, an "air" electrode 25 and lastly a grid 26.

The resistors $12_p$ and $13_p$ are juxtaposed respectively to the cells $2s$ and $2i$ through their negative end.

More precisely, the grids 26 and $d$ are common as the air electrodes and the catalytic layers $c$ and the separators 24 and $b$.

The positive ends of these electrolytic resistors (normally interconnected by the conductor 17 (FIG. 9) are directly soldered or swaged onto the ends of the metallic tubes $10_p$ and $11_p$ which therefore fulfill the function of the sleeve 23 and which thus fulfill also for a minimum production cost the function of the connection 17 shown in dotted lines and which has thus become redumdant.

Of course, a similar disposition is adopted for the other modules $1_2$ to $1_4$ of the battery and their associated electrolytic resistors.

It will be observed that when an element incurs a danger of obstruction by precipitation of zinc powder, this occurence is avoided by polarizing said element positively, for the OH$^-$ ions then tend to prevent the aggolomeration of the zinc powder. For exemple, FIG. 9 shows a conductor 50 which polarizes the pump 9 positively. However, the tank 8 can be polarized positively if required.

A preferred embodiment of the invention will now be described.

The 15 Kw battery comprises 8 modules each delivering a p.d. of 12 volts.

The electrolyte is a 12 N aqueous potassium hydroxide solution containing zinc particles in suspension.

The embodiment described in FIG. 9 and have been adopted. The electrolytic resistors used each have a value of 50 ohms and allow a hydraulic flow of 2m$^3$/hour at 45° C.

The tube is made of Teflon and has a length of 1 m and a diameter of 20 mm.

Of course, some elements which are necessary for proper operation have not been illustrated, so as to make the explanation and the diagrams clearer.

In particular, it is advantageous for the electrolyte to be at a pressure lower than atmospheric pressure, for example by means of a suction pump, not shown in FIGS. 2, 8 and 9, which is common to the set of electrolyte return to tank pipes $11p$. This general disposition can be found again is U.S. Pat. No. 3,977,903 of Aug. 31, 1976 for "An electric safety coupling for a forced flow electric cell" and in U.S. patent application Ser. No. 648,233 of Jan. 12, 1976, for "A forced flow electrochemical cell." Another preferred means is to use a sealed tank which is subject to a slight pressure reduction in the order to 200 to 300 millibars by means of a small gas suction pump.

It is also stated for reference that it is advantageous that the cells empty themselves when stopped as shown also in U.S. patent application Ser. No. 648,233 of Jan. 12, 1976. For this purpose, as shown in FIGS. 2, 8 and 9, a small tube 70 allowing air to be let in when the pump is stopped is installed immediately at the output of the pump 9.

The invention is, of course, in no way limited to the embodiments described and illustrated, which have been given by way of example. In particular, without going beyond the scope of the invention, details can be modified, some arrangements, can be changed or some means can be replaced by equivalent means.

What is claimed is:

1. In an electrochemical battery comprising a plurality of cells, each cell comprising from the inside towards the outside in particular: a negative collector grid, a porous separator, a porous active catalytic layer, a positive collector grid, and a porous water repellant layer, said battery further comprising means for feeding said cells in series with an electrolytic solution comprising an active material in suspension and in particular zinc powder, said feeding means comprising means for conveying said solution inside said cells, said cells being grouped into $m$ modules, each capable of delivering a potential difference U and being connected electrically in series with said modules, means for connecting said modules electrically in series and means for feeding said modules with said solution in parallel, said module feeding means comprising a pump and for each module an input and output pipe for conveying solution from a storage tank towards each of said modules through said input pipe and being returned to said tank after having passed through said module through said output pipe, the improvement comprising $p$ designating the rank of a module, said input pipe as well as said output pipe, each comprising at least one electrolytic resistor, said electrolytic resistors being respectively, the input resistor and the output resistor for each module in which said solution flows, and means for connecting said resistors such that said input resistor causes the potential of the solution to vary from the value of the potential in said tank to the value of the potential at the input of said module, and said output resistor causes the value of said potential of the solution to vary from the value of the potential at the output of said module to the value of the potential in said tank.

2. The battery according to claim 1, wherein for each module, said means for connecting said resistors comprises means for connecting the positive end of said input resistor to the negative terminal of the module and the positive end of said output resistor to the positive terminal of the module and for connecting the negative ends of both resistors to the negative terminal of the battery so that the input resistor raises the value of the potential of the solution by a value of $(p-b\ 1)$ U while the output resistor lowers said potential of the solution by a value of $p$U.

3. The battery according to claim 1, wherein for each module, said means for connecting said resistors comprises means for connecting the positive end of said input resistor to the negative terminal of said module and the positive end of said output resistor to the positive terminal of said module and for connecting the negative end of said input resistor in common with the negative ends of the other input resistors in a ring connected to a collector tube communicating with said pump and the negative end of said output resistor in common with the negative ends of the other output resistors in a ring connected to a collector tube leading into said tank, and means for connecting said rings to the negative terminal of the battery, so that said input resistor raises the value of the potential of the solution by a value of $(p-1)$ U while said output resistor lowers said potential of the solution by a value of $p$U.

4. The battery according to claim 1, wherein for each module, said means for connecting said resistors comprises means for connecting the negative end of said input resistor to the negative terminal of said module and the negative end of said output resistor to a positive terminal of the module and for connecting the positive ends of both resistors to the positive terminal of the battery so that said input resistor lowers the value of the potential of the solution by a value of $(m-p+1)$ U whereas said output resistor raises said potential of the solution by a value of $(m-p)$ U.

5. A battery according to claim 1, wherein said electrolytic resistors comprise a tube made of an electrically insulative material, whose positive end comprises a grid made of a conductive material capable of holding back the zinc particles in suspension, the negative end of said resistor comprising, from the inside towards the outside, successively, a porous insulative and hydrophilous separator, an electrode capable of consuming the oxygen in the air and of forming hydroxide ions and a grid.

6. A battery according to claim 1, wherein said electrolytic resistors each comprise a tube made of an electrically insulative material whose positive end comprises a grid made of a conductive material capable of holding back the zinc particles in suspension, the negative end of said resistor being made of a conductive material with a high hydrogen overtension and free from inclusion of elements which could form intermetallic compounds with the zinc so that zinc particles are deposited on its surface by electrolysis, then detached and drawn away by said solution.

7. The battery according to claim 6, wherein said conductive material is substantially free of copper, nickel, iron and zinc and comprises magnesium.

8. A battery according to claim 6, wherein the inner surface of said negative end is polished.

9. A battery according to claim 6, wherein the inner surface of said negative end is partitioned into conductive zones and insulative zones.

10. A battery according to claim 9, wherein said insulative partition zone is formed by a layer of a cracked insulative material.

11. A battery according to claim 9, wherein said insulative partition zone is formed by grooves in which an insulative material is deposited.

12. A battery according to claim 6, wherein said negative end is coated on its inner surface with an insulative coating pierced with small holes.

13. A battery according to claim 6, wherein said negative end comprises growths preferably made of same material, said growths each ending in a point lying parallel to and in the same direction as the flow of said alkaline solution, said negative end being coated with an insulative layer, said growths being likewise coated with an insulative layer except for the end part of the points.

14. The battery according to claim 6, wherein said negative end also comprises a part disposed in the axis of the tube, this part comprising a core of the same material as said negative end and ending in a point lying parallel to and in the same direction as the flow of said alkaline solution, said part being integral with an electric conductor, said negative end of said electric conductor being coated with an insulative layer, said part being likewise coated with an insulative layer except for the end part of the point.

15. The battery according to claim 5, wherein said tube except for its ends is made of a water-repellent material.

16. A battery according to claim 5, wherein said tube is made of an insulative material internally coated with a water-repellent material.

17. A battery according to claim 5, wherein a part of said tube delimited by two transversal cross-sections perpendicular to its axis is made of a water-repellent material, the remaining part being made of an insulative material.

18. A battery according to claim 15, wherein said water-repellent material comprises polytetrafluorethylene.

19. A battery according to claim 1, wherein in each module, the input resistor as well as the output resistor are juxtaposed through their negative ends respectively to the top cell and to the bottom cell of said module, so that the separator, the air electrode and the grid will be common respectively to the separator, the catalytic layer and the grid of the juxtaposed cell.

20. A battery according to claim 19, wherein in each module, the positive ends of the input resistor as well as of the output resistor, are constituted by the end of the pipes conveying the electrolyte.

21. A battery according to claim 1, wherein at least said pump and the tank are positively polarized.

* * * * *